Sept. 12, 1939.  A. KATZINGER  2,172,538

HOLDER FOR SLICING BREAD

Filed Dec. 10, 1937  2 Sheets-Sheet 1

INVENTOR.
Arthur Katzinger
BY Stanley Hoods
ATTORNEY.

Sept. 12, 1939.   A. KATZINGER   2,172,538
HOLDER FOR SLICING BREAD
Filed Dec. 10, 1937   2 Sheets-Sheet 2

Inventor
Arthur Katzinger
By Stanley Hoods
Atty.

Patented Sept. 12, 1939

2,172,538

UNITED STATES PATENT OFFICE 2,172,538

HOLDER FOR SLICING BREAD

Arthur Katzinger, Glencoe, Ill., assignor to The Edward Katzinger Company, Chicago, Ill., a corporation of Illinois Application December 10, 1937, Serial No. 179,089

2 Claims. (Cl. 146—150)

This invention relates to a holder for use in reslicing ready-sliced bread or the like, and is especially applicable to the preparation and serving of dainty-type sandwiches as carried on incidentally in the home.

It is an object of this invention to provide a holder for gripping a bread slice in edge-exposed condition and effective in service to prevent edgewise collapse of the slice while undergoing dissection.

It is a further object of this invention to provide a holder of this nature having means for guiding a knife blade or the like in spaced relation to the faces of the slice to facilitate accurate cutting of the slice into thin slices of uniform thickness.

It is also an object of this invention to provide a holder of attractitve and pleasing appearance and yet substantial, practical and sanitary without expensive tool, assembly and manufacturing costs.

With the above and other objects in view, as will be apparent, this invention consists in the construction, combination and arrangement of parts, all as hereinafter described, claimed and illustrated in the accompanying drawings, wherein:

Figure 1:
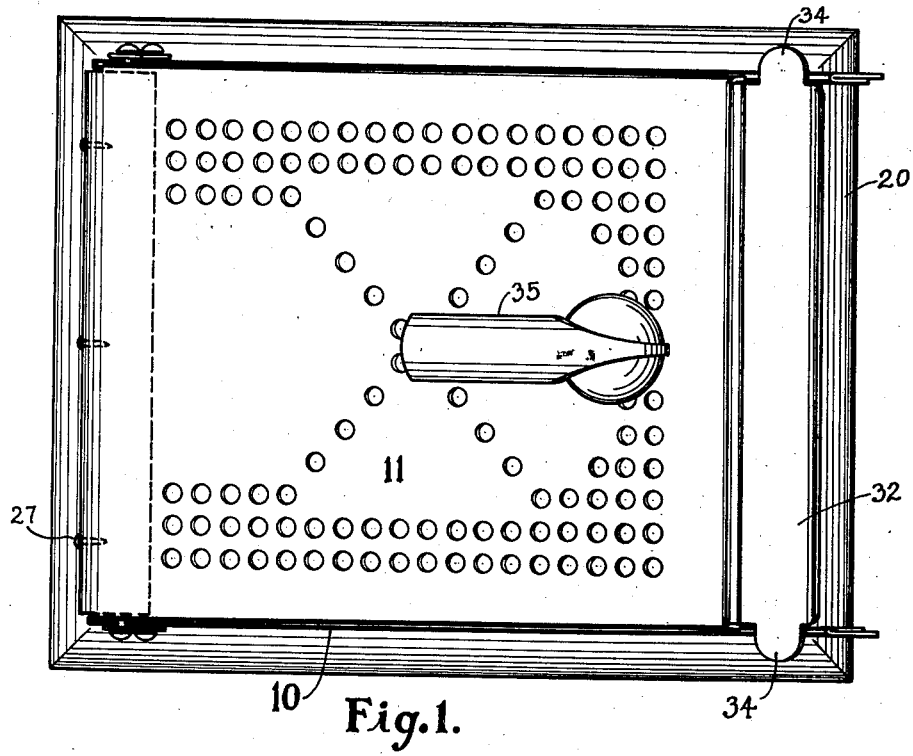
Fig. 1 is a top plan view of a holder forming the subject of this invention.
Figure 3:
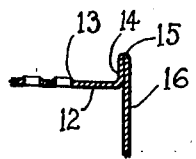
Fig. 3 is a fragmentary vertical section taken on line 3—3 of Fig. 2.
Figure 2:
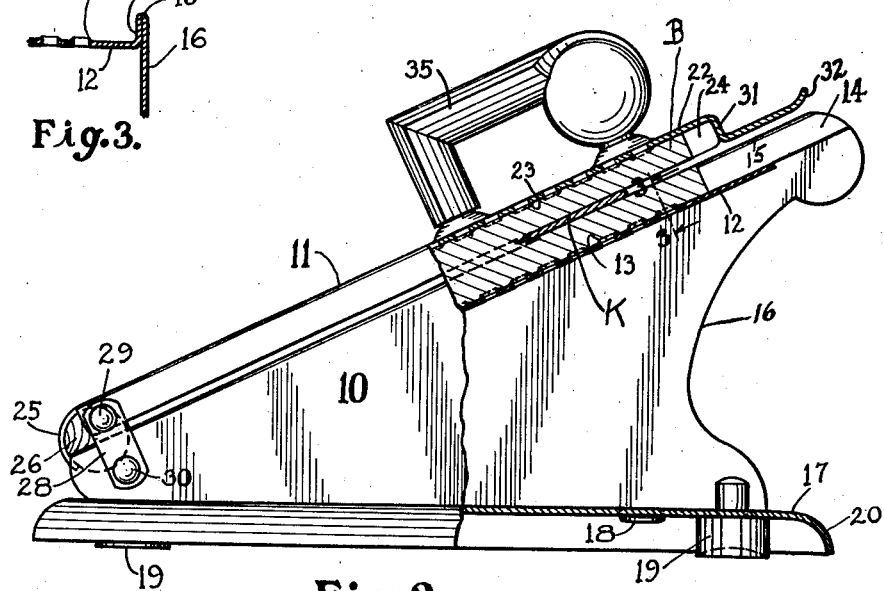
Fig. 2 is a side elevational view of the device shown in Fig. 1, with parts broken away to illustrate details of construction.
Figure 4:
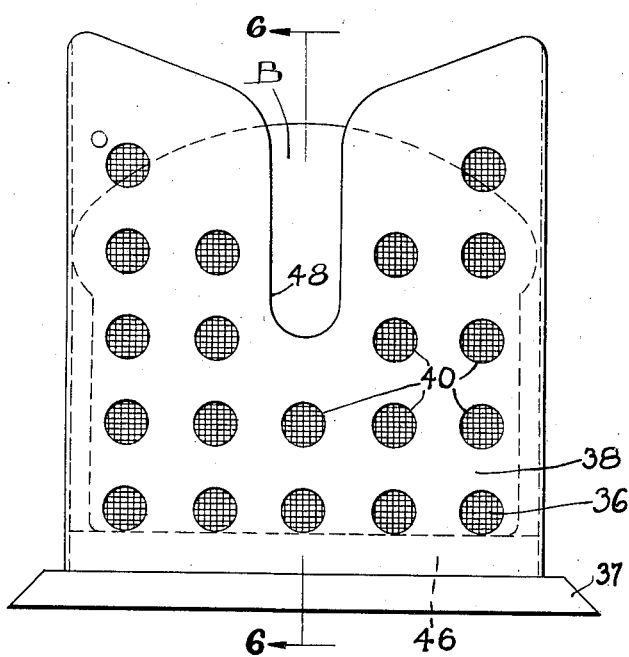
Fig. 4 is a side elevational view of a modified form of holder embodying the principles of this invention.
Figure 5:
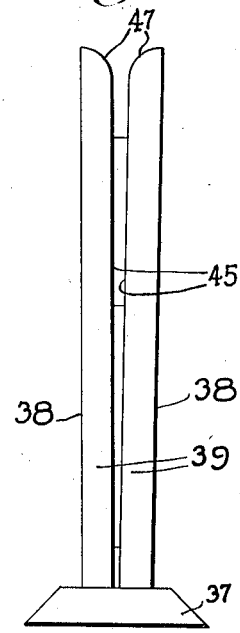
Fig. 5 is an end view of the device shown in Fig. 4.
Figure 6:
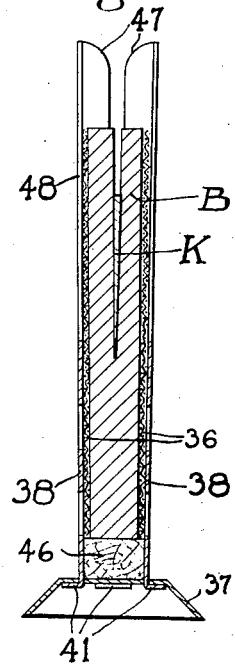
Fig. 6 is a vertical section taken on line 6—6 of Fig. 4.
Figure 7:
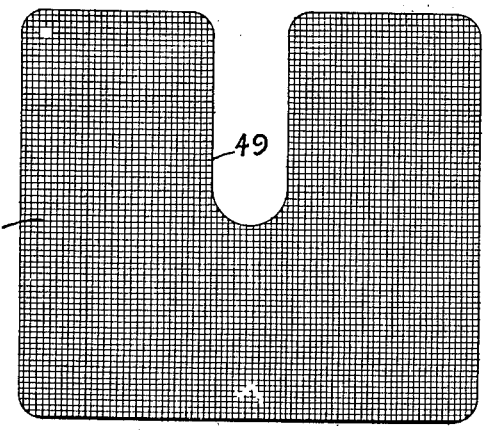
Fig. 7 is a detail view of a member operable in connection with the holder shown in Figs. 4, 5 and 6 to sustain a bread slice against edgewise collapse during its dissection.

The holder representing the subject of this invention, as shown in Figs. 1 and 2, comprises a receptacle 10 and a cover 11 of sheet metal or other suitable material. The receptacle 10 is generally rectangular in plan and is composed of an inclined flat face 12 having burred formations 13 of any suitable configuration, and extensions in the nature of lateral rims 14 extending upwardly from said face to create a relatively shallow enclosure in which a bread slice, designated as B in the drawings, may be flatly confined. The burrs 13 furnish a surface to which the face of the confined bread slice may readily attach itself.

The rims 14 are bent respectively outwardly and downwardly upon themselves to form a straight upper edge 15 coincident with a plane substantially midway between the faces of a confined slice. Thus the edges 15 provide a guide or bearing for spacing and positioning a knife blade, designated in the drawings as K, in relation to the faces of the confined slice to facilitate accurate cutting of the slice into two portions of uniform thickness.

The downwardly bent portions of the extensions or rims 14 terminate in bottom edges which converge along their lengths from the front to the rear of the receptacle 10, according to the desired inclination of the face 12 and rim edges 15, to form legs 16. A bottom member 17 arranged to span the legs 16 is suitably secured to the lower edges of the latter, as at 18. Feet 19 of rubber or the like are fastened to the underside of the bottom member 17 to support the body 10 in elevated relation to a table or other support. At its outer edges the bottom member 17 terminates in a downwardly cupped shoulder 20 which substantially conceals the feet 19 and generally creates a base of substantial yet pleasing and attractitve appearance.

The cover 11 is of a size sufficient to overlie and embrace the area of the body 10 with which it coacts, and, as illustrated, consists of a face portion 22, having burred formations 23 and rims 24 projecting from its underside, corresponding to similar elements of the receptacle 10. The rims 24 preferably are adapted to register with the rims 14 of the receptacle 10, but are somewhat narrower or shorter so as not to obstruct the desired space or opening between the edges of the rims 24 and 14 respectively for admitting the knife blade K. The edge portion 25 of the cover 11, in proximity to the rear edge of the receptacle 10, is bent downwardly to partially enclose a stop 26 disposed between the rims 14 and 24 of the receptacle and cover, respectively. The stop 26 provides an abutment for the lowermost peripheral edge of the deposited bread slice and is therefore preferably made of wood so as not to dull the knife blade used in cutting the slice. Any suitable fastening means, such as pins 27 piercing the edge portion 25 of the cover and anchored in the stop 26, may be used to fix the latter against displacement.

As shown in Fig. 2, the cover 11 is pivoted to the receptacle 10 through a link 28, as at 29 and 30. Obviously, as the pivots 29 and 30 approach alignment in perpendicular relation to the plane of the slice holding surfaces, the space between the edges of the rims 14 and 24 is enlarged while movement of the pivots 29 and 30 out of such alignment produces a reverse effect. Consequently, the cover 11, with this type of connection, is capable of adjustment in various planes parallel to the edge 15 of the receptacle to accommodate slight variations in the thickness of the confined slice.

The edge portion of the cover 11 which cooperates with the upper transverse edge of the receptacle 10 to form a mouth or entrance for introducing the bread slice to be cut, is bent to form a shoulder 31 of substantially the same width as the rims 24, and terminates at its lower edge in a forwardly projecting and outwardly rounded lip 32. Ears 34, constituting lateral extensions of the lip 32, project beyond either side of receptacle 10 to provide convenient finger holds for manipulating the cover 11. A handle 35 applied to the upper side of the cover, 11 as shown in the drawings, also furnishes additional means for opening and closing the cover 11 as well as enhances the general appearance of the holder representing this invention.

The holder, as illustrated in Figs. 1 and 2 and described hereinbefore, is adapted to receive and firmly hold a bread slice against edgewise collapse during dissection when ordinary pressure is applied to the cover 11 so as to force the confined slice to attach itself to the burred surfaces of the receptacle 10 and the cover 11. It will be understood that many changes and modifications may be made in the design and construction of the holder embodying this invention without departing from the spirit of this invention. For example, in that form of the invention illustrated in Figs. 4 to 7, inclusive, the bread slice B is confined between a pair of wire screen liners 36 suitably constructed and attached to the inner faces of a vertically disposed receptacle consisting of a bottom 37, side walls 38 and end walls 39. As shown, the side and end walls 38 and 39 respectively, are attached to the bottom 37 by means of lugs 41 extending downwardly from said walls 38 and 39 and bent through suitable openings in the bottom 37. It will be manifest, however, that this connection may be eliminated by forming the bottom, side and end walls of the receptacle from a single sheet of metal. The end walls 39 consist of inwardly bent lateral margins of the side walls 38, said end walls extending inwardly a distance slightly less than halfway between the side walls 38. The inner edges 45 of said end walls 39 thereby define a central slot or opening of sufficient width to admit the blade of a knife. The mouth of the receptacle and the slots defined by the edges 45 of the end walls which form a continuation thereof, accordingly provide an uninterrupted passageway through which a knife blade K may be readily passed for completely dissecting the slice B.

A block of wood 46 on which the bottom edge of the slice B may rest, serves to protect the knife blade as it intersects the bottom edge of the slice. The block 46 may also function as a wedge effective to distend the side walls 38 as shown in the drawings, which tension action serves to enlarge the mouth of the receptacle for easy insertion of the slice B, as well as to taper the knife passage favorably to its ready entry. The inner edges of the end walls 39 at their upper extremities are preferably rounded as at 47 to further facilitate the insertion of the knife blade.

It will be noted that the walls of the receptacle shown in Figs. 4 to 7 inclusive are preferably of a height to project above the top of the confined bread slice, resulting in an upward extension of the inner edges 45 of the end walls 39 as well as the slot defined thereby. This extension of the edges 45 is of material aid to the person doing the cutting in accurately centering the knife blade before the blade actually enters the slice and while it is initially entering the slice. The extension further provides ample surface on the side walls 38 against which the fingers of the cutter may be applied to compress the walls of the receptacle and thereby localize the gripping force on the slice as desired, without interfering with or obstructing the blade of the knife.

The upwardly extending portions of the side walls 38, as well as the wire screen liners cooperating therewith, are preferably notched as at 48 and 49, respectively, to expose a portion of the faces of the slice. This furnishes access to the slice for the purpose of either steadying the slice during the cutting operation or for withdrawing the slices when ready for removal. Should it be desired to minimize the weight of the receptacle, perforations 40 may be provided in the walls 38 for this purpose.

While the foregoing specification sets forth the invention in specific terms, it is to be understood that numerous changes in the shape, size and materials may be resorted to without departing from the scope of the invention as claimed hereinafter.

What is claimed is:

1. A device for facilitating the accurate bisection of a conventional slice of baker's loaf bread into two similar slices each of one-half conventional thickness, comprising a flat plate member adapted to engage one entire face of a conventional slice of bread, a second flat plate member adapted to engage the entire other face of said bread slice, means for securing said two plate members against lateral relative displacement when juxtaposed upon the bread slice, stop means for said plate members positively limiting their approach to a position of parallelism characterized by a predetermined spacing slightly less than the thickness of the bread slice to be bisected, a multiplicity of bread slice impaling members distributed upon and extending inwardly from the bread-engaging face of one of said plate members a distance materially less than one-half the positive plate-spacing determined by said stop means, inwardly extending flanges having a straight edge along both side edges of both of said juxtaposed plate members, said straight edges of one plate member, when the plates are in operative position, being parallel to and slightly spaced from the straight edges of the other plate member, said spaced edges forming guides for a knife and restraining the blade of the knife to a single cutting plane midway between and parallel to the planes of said parallely juxtaposed plate members.

2. A device for facilitating the accurate bisection of a conventional slice of baker's loaf bread into two similar slices each of one-half conventional thickness, comprising a flat plate member adapted to engage one entire face of a conventional slice of bread, a second flat plate member adapted to engage the entire other face of said bread slice, there being a hinge at one end of said second plate member, means including said hinge for securing said two plate members against lateral relative displacement when juxtaposed upon the bread slice, a handle on said hinged plate member, stop means for said plate members positively limiting their approach to a position of parallelism characterized by a predetermined spacing slightly less than the thickness of the bread slice to be bisected, a multiplicity of bread slice impaling members distributed upon and extending inwardly from the bread-engaging face of one of said plate members a distance materially less than one-half the positive plate-spacing determined by said stop means, inwardly extending flanges having a straight edge along both side edges of both of said juxtaposed plate members, said straight edges of one plate member, when the plates are in operative position, being parallel to and slightly spaced from the straight edges of the other plate member, said spaced edges forming guides for a knife and restraining the blade of the knife to a single cutting plane midway between and parallel to the planes of said parallely juxtaposed plate members.

ARTHUR KATZINGER.